United States Patent [19]
Parsoneault et al.

[11] Patent Number: 5,793,129
[45] Date of Patent: Aug. 11, 1998

[54] LOW DISTORTION INTERFERENCE FITS FOR SPINDLE MOTOR ASSEMBLY

[75] Inventors: Norbert Steven Parsoneault, Watsonville; Hans Leuthold; David John Jennings, both of Santa Cruz; Samnathan Murthy, Campbell, all of Calif.

[73] Assignee: Seagate Technology, Inc., Scotts Valley, Calif.

[21] Appl. No.: 866,810

[22] Filed: May 30, 1997

Related U.S. Application Data

[63] Continuation-in-part of Ser. No. 397,566, Mar. 2, 1995, Pat. No. 5,666,716.

[51] Int. Cl.⁶ .................................................. H02K 15/14
[52] U.S. Cl. .......................... 310/42; 310/67 R; 29/596; 29/525
[58] Field of Search .......................... 310/42, 67 R; 360/78.13, 104, 106; 29/525, 596, 598

[56] References Cited

U.S. PATENT DOCUMENTS

| | | | |
|---|---|---|---|
| 4,739,427 | 4/1988 | Kilmer et al. | 360/98.07 |
| 4,828,467 | 5/1989 | Brown | 418/201.1 |
| 4,920,812 | 5/1990 | Okamoto et al. | 74/6 |
| 5,149,111 | 9/1992 | Han | 279/2.03 |
| 5,313,355 | 5/1994 | Hagen | 360/104 |
| 5,358,339 | 10/1994 | Konno et al. | 384/107 |
| 5,666,716 | 9/1997 | Parsoneault | 29/596 |

Primary Examiner—Steven L. Stephan
Assistant Examiner—Judson H. Jones
Attorney, Agent, or Firm—LaRiviere, Grubman & Payne

[57] ABSTRACT

For a precision spindle motor, an invention for reducing distortion resulting from interference fits of a thrust plate to spindle motor shaft and of a counter plate to a journal. A method of assembly according to the invention includes the step of balancing an interference pressure about a centerline of at least one of the thrust plate and the counter plate of the spindle motor. A precision spindle motor according to the invention comprises a journal having a bore defined therein, a shaft located in the bore, a thrust plate mounted to a top portion of the shaft by means of an interference fit, and a counter plate mounted to the journal adjacent to the thrust plate by means of an interference fit, wherein an interference pressure is balanced about a centerline of at least one of the thrust plate and the counter plate.

6 Claims, 4 Drawing Sheets

LOW DISTORTION INTERFERENCE FITS FOR SPINDLE MOTOR ASSEMBLY

This is a continuation-in-part of application Ser. No. 08/397,566, filed Mar. 2, 1995, now U.S. Pat. No. 5,666,716.

TECHNICAL FIELD

The invention relates to computer disk drives. More specifically, the invention relates to an external stator, hydrodynamic spindle motor assembly for a computer hard disk drive.

BACKGROUND ART

Hydrodynamic spindle motors manufactured for hard disk drives are typically made for a confined volume. Consequently, very tight tolerances must be observed. Small deformations owing to press (interference) fitting can violate the requirements of these tight tolerances. Thus, a problem with assembly of spindle motors was controlling the amount of deformation owing to interference fits.

DISCLOSURE OF INVENTION

The present invention is directed at low distortion interference fits for a spindle motor in a hard disk drive assembly. Particularly, the present invention is directed at press fitting a thrust plate to a spindle motor shaft and at press fitting a counter plate to a spindle motor journal for an external stator, hydrodynamic spindle motor.

The present invention provides a method of assembly of a precision spindle motor. The method comprises assembling a thrust plate around a top, exposed portion of a spindle motor shaft. The thrust plate is attached to the portion of the shaft by means of a press fit. To reduce axial deformation of the thrust plate for maintaining a consistent thrust gap, an undercut is made in the shaft. The undercut provides a relief for the press fitting of the thrust plate to the spindle motor shaft for equalizing interference pressure about a centerline of the thrust plate. The undercut may be exactly specified for causing the net pressure from the press fit to act at the centerline of the thrust plate. In other words, the pressure above the centerline and the pressure below the centerline are approximately to exactly equal. This equalization results in improved perpendicularity, while balancing interference pressure about the centerline of the thrust plate thus reducing warpage.

The present invention also provides a method of press fitting a counter plate to a spindle motor journal. The counter plate is made with a chamfer around its outer periphery. Because the counter plate is pressed into a relatively thin walled tube-like portion of the journal, the walls forming the tube-like portion tend to bend away from the counter plate, i.e., the thin walls deform in a generally radial direction away from the counter plate. The chamfer extends to the center of the counter plate. The chamfer provides "line contact" with the journal at the centerline of the counter plate. Because of the chamfer, interference pressure acts at the centerline of the counter plate. Thus, there is approximately no net moment which would normally cause the counter plate to warp. As with the thrust plate, the interference pressure is effectively balanced about the counter plate centerline.

More particular, according to the invention there is provided a method of assembly of a precision spindle motor, the motor including a journal, a counter plate, a shaft and a thrust plate, the thrust plate for assembly to the shaft by means of an interference fit and the counter plate for assembly to the journal by means of an interference fit, the method comprising the step of balancing an interference pressure about a centerline of at least one of the thrust plate and the counter plate.

Preferably, the balancing step comprises the step of interference fitting an outer side surface of the counter plate to an inner interference surface of the journal, at least one of the outer side surface and the inner interference surface being shaped to balance an interference pressure about the centerline of the counter plate.

Alternatively, the balancing step comprises the step of interference fitting an inner surface of the thrust plate to an outer interference surface of the shaft, at least one of the outer interference surface of the shaft and the inner surface of the thrust plate being shaped to balance an interference pressure about the centerline of the thrust plate.

Further according to the invention there is provided a method of assembly of a precision spindle motor, the motor including a journal and a counter plate, the method comprising the step of interference fitting an outer side surface of the counter plate to an inner interference surface of the journal, at least one of the outer side surface of the counter plate and the inner interference surface of the journal being shaped to balance an interference pressure about the centerline of the counter plate.

Also according to the invention there is provided a method of assembly of a precision spindle motor, the motor including a shaft and a thrust plate, the method comprising the step of interference fitting an inner surface of the thrust plate to an outer interference surface of the shaft, at least one of the outer interference surface of the shaft and the inner surface of the thrust plate being shaped to balance an interference pressure about the centerline of the thrust plate.

The invention also provides a precision spindle motor comprising:

a journal having a bore defined therein, the journal including a tube-like protrusion defining an inner interference surface;

a shaft located in and extending from the bore of the journal, a top portion of the shaft extending from the bore, the top portion of the shaft including an outer interference surface;

a thrust plate having a hole defined therein by an inner surface of the thrust plate, the thrust plate being mounted to the top portion of the shaft by means of an interference fit between the outer interference surface of the shaft and the inner surface of the thrust plate;

a counter plate including an outer side surface, the counter plate being mounted to the journal adjacent to the thrust plate by means of an interference fit between the inner interference surface of the journal and the outer side surface of the counter plate, wherein an interference pressure is balanced about a centerline of at least one of the thrust plate and the counter plate.

As will be apparent to those of ordinary skill in the art of the present invention, the present invention provides a spindle motor, and method of assembling same, which is inherently insensitive (less warpage) to the amount of interference, which allows for larger tolerances on parts thus reducing cost.

Other features of the present invention are disclosed or apparent in the section entitled: "BEST MODE FOR CARRYING OUT THE PRESENT INVENTION."

BRIEF DESCRIPTION OF DRAWINGS

For fuller understanding of the present invention, reference is made to the accompanying drawing in the following

Figure 1:
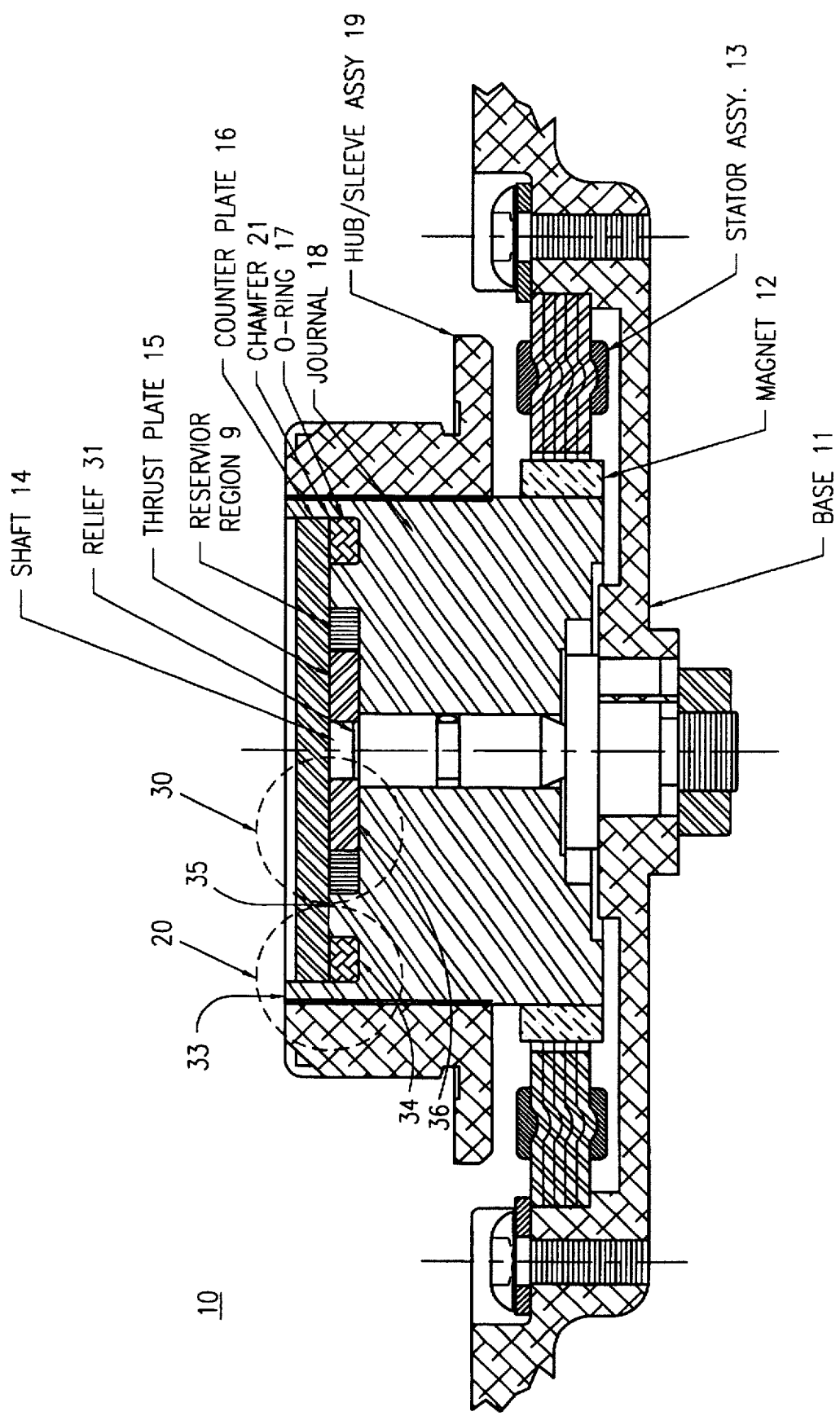
Figure 2:
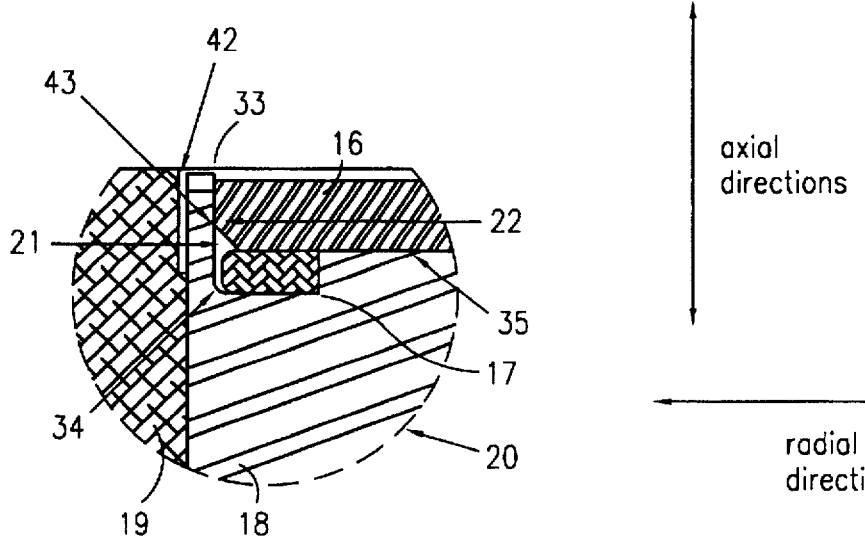
Figure 2A:
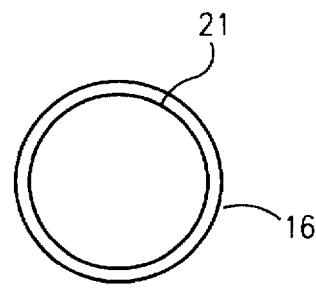
Figure 2B:
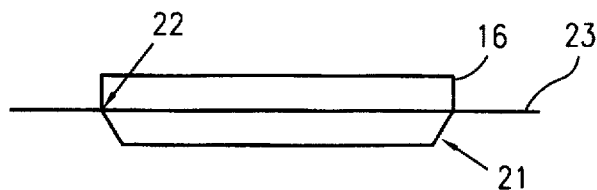
Figure 3:
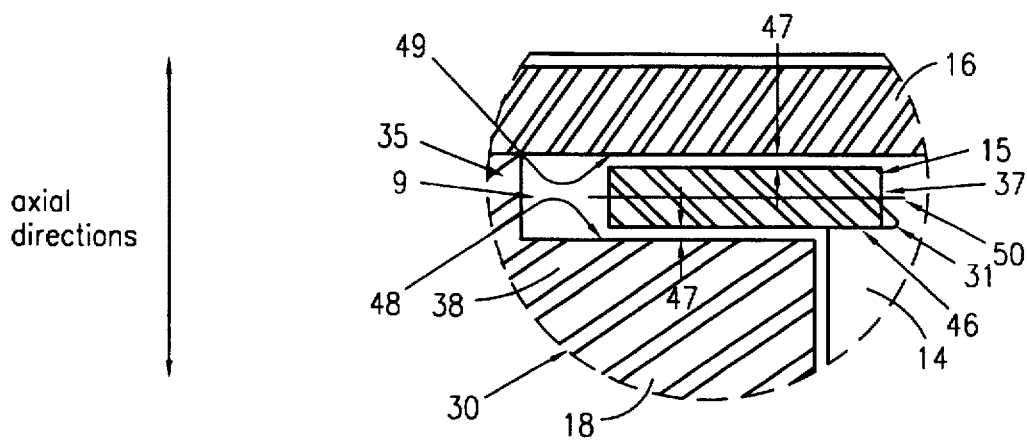
Figure 4:
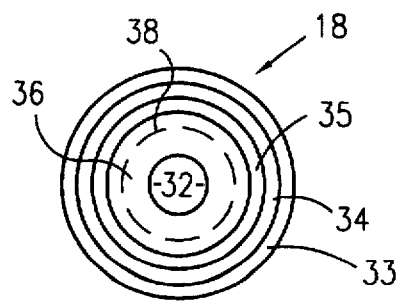
Figure 5:
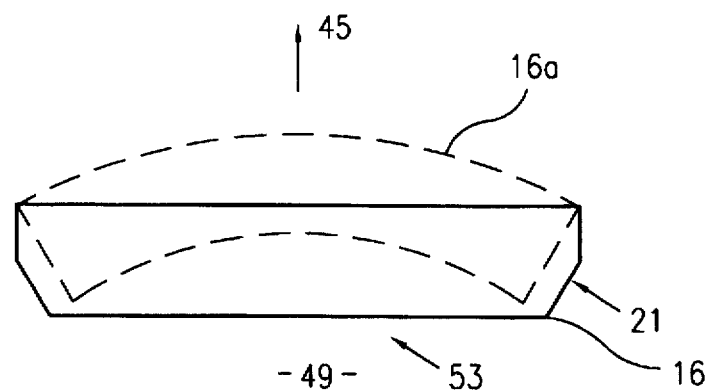
Figure 6:
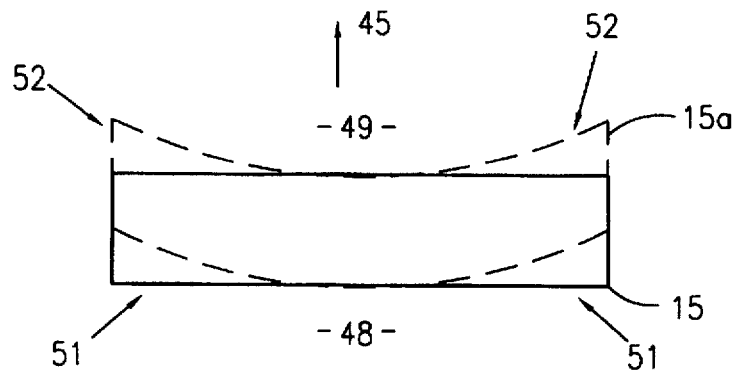
Figure 7:
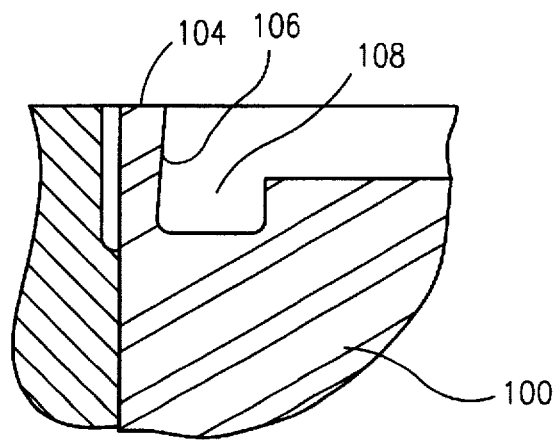
Figure 8:
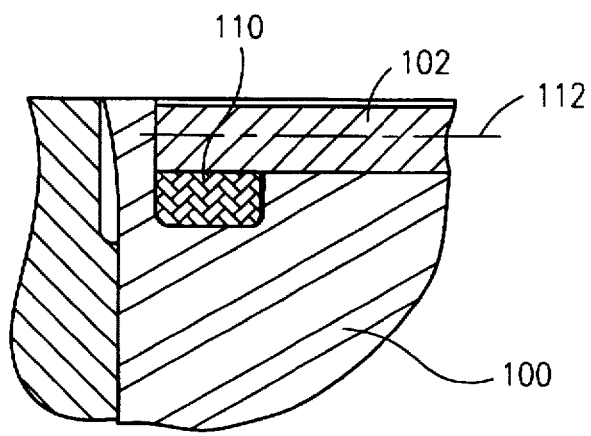
Figure 9:
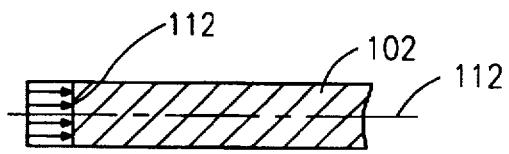

3 detailed description of the Best Mode of Carrying Out the Present Invention. In the drawings:

FIG. 1 is a cross section of a portion of a spindle motor in accordance with the present invention;

FIG. 2 is an enlarged view of a circled area of FIG. 1;

FIG. 2A is a bottom elevation view of a counter plate in accordance with the present invention;

FIG. 2B is a side plan view of a counter plate in accordance with the present invention;

FIG. 3 is an enlarged view of a circled area of FIG. 1;

FIG. 4 is a top elevation view of a journal in accordance with the present invention;

FIG. 5 is a side plan view of a counter plate in accordance with the present invention; and FIG. 6 is a side plan view of a thrust plate in accordance with the present invention;

FIG. 7 is a cross sectional partial view of a journal and hub/sleeve assembly of an alternative embodiment of a spindle motor in accordance with the invention;

FIG. 8 shows the journal of FIG. 7 with a counter plate assembled thereto;

FIG. 9 illustrates the interference pressure on the counter plate illustrated in FIG. 8.

Reference numbers refer to the same or equivalent parts of the present invention throughout the several figures of the drawing.

BEST MODE FOR CARRYING OUT THE PRESENT INVENTION

As hard disk drives and spindle motors are both well known in the art, in order to avoid confusion while enabling those skilled in the art to practice the claimed invention, this specification omits many details with respect to those known items.

Referring to FIG. 1, there is shown a cross section of spindle motor 10 in accordance with the present invention. Spindle motor 10 is for a computer hard disk drive and comprises base 11, magnet 12, stator assembly 13, shaft 14, thrust plate 15, counter plate 16, o-ring 17, journal 18, and hub/sleeve assembly 19. Spindle motor 10 is particularly well suited for a fluid dynamic bearing application.

Referring now to FIG. 2, there is shown an enlarged view of circled area 20 of the cross-sectional view of FIG. 1. As shown, counter plate 16 is made having a chamfer 21 in accordance with the present invention. As shown in the bottom elevation view of counter plate 16 in FIG. 2A, chamfer 21 extends around counter plate 16. In the side plan view of counter plate 16 in FIG. 2B, centerline 23 indicates the extension of chamfer 21 to center 22. By extending to center 22, chamfer 21 facilitates "line contact" at centerline 23 as between counter plate 16 and journal 18 when assembled to journal 18.

Protrusion 33 forms a tube-like contour for receiving counter plate 16. The tube-like contour of protrusion 33 of journal 18 is relatively thin as compared with counter plate 16.

In continued reference to FIG. 2 in combination with FIG. 2B, assembly of counter plate 16 to journal 18 results in interference fit 43. Interference fit 43 causes protrusion 33 to deflect radially away from counter plate 16 and into region 42. Without chamfer 21, counter plate 16 would bow in an axial direction due to pressure from interference fit 43. However, owing to line contact, as facilitated by chamfer 21, between counter plate 16 and protrusion 33 of journal 18,

4 interference pressure between counter plate 16 and protrusion 33 acts at centerline 23 of counter plate 16. This balancing of interference pressure about centerline 23 results in approximately no net moment for inducing counter plate 16 warpage in an axial direction. Consequently, top thrust gap 49 (shown in FIG. 3) requirements are not violated.

Referring to FIG. 3, there is shown an enlarged view of circled area 30 of the cross-sectional view of FIG. 1. Shaft 14 is made having a relief 31 in accordance with the present invention. Relief 31 extends around shaft 14 as shown in FIG. 1. Thrust plate 15 is mated with shaft 14 via press fit 37. Reservoir region 9, shown in FIG. 3, comprises two narrow gaps, namely, bottom thrust gap 48 and top thrust gap 49. Reservoir region 9 is particularly well suited for holding lubricating fluid (e.g., oil) for a fluid dynamic bearing application.

Normally, press fit 37 would cause deformation of thrust plate 15 violating thrust gap 48, 49 requirements. However, relief 31 is geometrically shaped balancing interference pressure distribution about centerline 50 of thrust plate 15 such that axial translation of thrust plate 15 is reduced. Relief 31 is shaped for minimizing axial translation of thrust plate 15, by causing the pressure to be approximately equally distributed about centerline 50 of thrust plate 15. As interference pressure owing to press fit 37 is balanced about centerline 50, approximately no net moment results for causing warpage of thrust plate 15 in an axial direction. It will be appreciated that, in the illustrated embodiment, the balancing of the interference pressure is obtained by providing a contact area between the outer interference surface of the shaft 14 and the inner surface of the thrust plate 15 which is asymmetrically distributed about the centerline of the thrust plate.

While the actual resultant shape of relief 31 will depend in part on the geometries involved, the method of the present invention reduces warpage of thrust plate 15 such that thrust gap 48, 49 requirements are not violated.

With reference to FIGS. 1 and 3 in combination, by control of the geometries, the present invention reduces warpage owing to interference fitting counter plate 16 and thrust plate 15 to form spindle motor 10. Thus, with the present invention, substantially uniform and flat widths 47 for thrust gaps 48, 49 may be achieved, i.e., thrust plate 15 and counter plate 16 are ostensibly longitudinally flat after assembly.

Referring to FIG. 4, there is shown a top elevation view of journal 18 in accordance with the present invention. Referring to FIG. 1 in combination with FIG. 3B, journal 18 comprises protrusions 33 and 35. Protrusions 33 and 35 in combination define gap 34. Gap 34 is for receiving o-ring 17. Protrusion 33 defines a gap for receiving counter plate 16, as shown in FIG. 1. Protrusion 35 defines a gap 36 for receiving a portion of shaft 14 and for receiving thrust plate 15. Shaft 14 is received through opening 32 of journal 18. Protrusion 35 defines a boundary of a reservoir region 9 (shown in FIG. 3).

Referring to FIG. 5, there is shown a side plan view of counter plate 16. Without chamfer 21, counter plate 16 would likely bow in an axial direction 45 owing to interference pressure, as indicated by phantom counter plate 16a. Consequently, top thrust gap 49 would be increased, especially in central region 53.

Referring to FIG. 6, there is shown a side plan view of thrust plate 15. With continuing reference to FIG. 6 in combination with reference to FIG. 3, without relief 31, thrust plate 15 would likely warp at each end in axial direction 45, as indicated by phantom thrust plate 15a. Consequently, top thrust gap 49 would be narrowed to obliterated, especially at distal regions 52, and bottom thrust gap 48 would be increased, especially at distal regions 51. The amount of warpage of thrust plate 15a will vary owing to the specific geometries of the assembled parts. For example, the extent of shoulder 46 of shaft 14 likely will affect the amount of warpage of thrust plate 15a. Thus, it is necessary that relief 31 be formed to an appropriate extent bordering thrust plate 15 to achieve balanced distribution of interference pressure about centerline 50.

Referring to FIGS. 1 and 3 in combination, motor 10 stiffness is dependent in part on maintaining thrust gaps 48, 49. By maintaining thus gaps 48, 49, minimum widths for those gaps are provided. However, it is further important that gaps 48, 49 be substantially uniform, i.e., maximum and minimum width tolerances must be maintained and warpage must be minimized to maintain flatness. Typically, thrust plate 15 and counter plate 16 are made exceptionally flat, namely, flat to approximately one-half (½) micron. If thrust gap 48 or 49 is narrowed, then motor 10 is more subject to rubbing and/or seizing, i.e., very stiff. A motor 10 operating at approximately 10,000 revolutions per minute (rpm) suddenly seizing is not desirable. Moreover, owing to the operation of motor 10, if thrust gap 48 or 49 is widened, then motor 10 is less stiff, resulting in loss of load carrying capability. Therefore, it should be appreciated that even slight deformations of counter plate 16 and thrust plate 15 may affect performance of motor 10, especially where thrust gaps 48 and 49 are very narrow, namely, typically on the order of seven (7) microns wide. For thrust gaps which are especially narrow, approximately a five percent (5%) tolerance for each thrust gap 48, 49 is typical. (Notably, while specific values are stated herein, it should be understood that these values, e.g., speed of 10,000 rpm, flat within ½ micron, width of 7 microns, and tolerance of 5%, are merely illustrative of one embodiment of the present invention; it should be understood that the present invention may be practiced with other values for different embodiments.)

A further embodiment of the invention is illustrated in FIGS. 7 to 9. FIG. 7 illustrates a portion, corresponding to the circled area 20 in the FIG. 1 embodiment, of a journal 100 without a counter plate assembled thereto, while FIG. 8 illustrates the same portion of the journal 100 with a counter plate 102 assembled thereto.

In this embodiment of the invention, the structure and configuration of all of the components of the spindle motor, with the exception of the journal 100 and the counter plate 102, remains unchanged from the first embodiment. In particular, the balancing of an interference pressure about the centerline of the thrust plate 15 by providing a relief 31 in the shaft 14, is unchanged. However, in this embodiment, the journal 100 is different from the journal 18, and the counter plate 102 is different from the counter plate 16.

Referring to FIG. 7, the journal 100 has a tube like protrusion 104 which has an inner interference surface 106 to which the counter plate 102 is fitted. As can be seen from the figure, the inner interference surface is non-cylindrical in shape, and in fact defines a conical taper. As in the previous embodiment, the journal 100 also has a recess 108 defined therein for accommodating an O-ring 110.

The counter plate 102 in this embodiment is cylindrical in shape and does not have any chamfer or relief 21 as in the previous embodiment. The counter plate 102 defines an outer side surface 112 which fits against the inner interference surface 106 of the journal 100, to form an interference fit as shown in FIG. 8.

As mentioned above, the interference fit between the inner interference surface 106 of the journal 100 and the outer side surface 112 of the counter plate 102 causes the protrusion 104 to deflect radially away from counter plate 102. This happens because the protrusion 104 is unsupported at its upper edge. This deflection could create an uneven force distribution across the outer side surface of the counter plate, which would cause the warping illustrated in, and described above with reference to, FIG. 5.

By providing the inner interference surface 106 as a inwardly tapered surface as shown, the deflection of the protrusion 104 after assembly is anticipated and compensated for. In effect, upon assembly, the more compliant unsupported upper edge of the protrusion 104 is forced to defect further than the supported lower edge of the protrusion 104, thereby creating the substantially uniform interference pressure across the outer side surface of the counter plate 102, as illustrated in FIG. 9. This can also be appreciated in FIG. 8 which illustrates the counter plate 102 interference fitted to the journal 100, and the resulting deflection of the protrusion 104.

It will be appreciated that the taper of the surface 106 and the deflection of the protrusion 104 has been exaggerated for purposes of illustration. In practice, the inner surface 106 defines a frusto-conical surface with an angle relative to the axial direction of the thrust plate of 2°.

Referring again to FIG. 9, it can be seen that the interference pressure is balanced about the centerline 112 of the counter plate 102. Accordingly, there is no net moment about the centerline 112, which might otherwise cause the counter plate to warp. Accordingly, the uniformity and flatness of the bearing gap defined between the counter plate 102 and the thrust plate 15 is maintained.

While the embodiment of the invention described with reference to FIGS. 1 to 6 provides equally consistent thrust gaps when compared with the embodiment of the invention described with reference to FIGS. 7 to 9, Applicants consider the latter embodiment of the invention to be the "best mode" of the invention. This is because the journal 100 already requires machining steps in is manufacture, and the machining of the tapered surface 106 is therefore easily included as a modification of the existing machining processes. On the other hand, the counter plates 102 are preferably stamped, and the creation of the chamfer 21 require an additional, independent machining step.

It should be noted that, for the purposes of this specification, the term "journal inner interference surface" shall mean the inner surface of the journal directly opposite to the outer side surface of the counter plate after assembly, and which, but for any profiling of either surface, would be available to participate in the interference fit between the counter plate and the journal. Similarly, the term "shaft outer interference surface" shall mean the outer surface of the shaft directly opposite to the inner surface of the thrust plate after assembly, and which, but for any profiling of either surface, would be available to participate in the interference fit between the thrust plate and the shaft. Therefore, in FIG. 3, the outer interference surface of the shaft 14 includes both the relief 31 and the portion of the shaft 14 actually participating in the interference fit 37.

Consequently, the present invention provides method and apparatus for assembly of a spindle motor with the above-described interference fits while maintaining tight thrust gap tolerances. While the present invention has been particularly shown and described with respect to certain preferred embodiments and features thereof, it should be readily apparent to those of ordinary skill in the art that various changes and modifications in form and detail may be made without departing from the spirit and scope of the invention.

In particular, it will be appreciated that, while in the FIG. 3 embodiment, the shaft 14 defines a non-cylindrical surface for providing a contact area between the shaft outer interference surface and the thrust plate inner surface which is asymmetrically distributed about the center line of the thrust plate, the inner surface of the thrust plate could be provided with the non-cylindrical surface instead. Also, instead of the relief 31, the shaft outer interference surface or the thrust plate inner surface could be provided with a taper similar to that of the inner surface 106 of the journal 100. Further, the journal inner interference surface or the counter plate outer side surface could be provided with a relief wherein the contact area between the outer side surface of the counter plate and the inner interference surface of the journal after interference fitting is asymmetrically distributed about the centerline of the counter plate, for balancing the interference pressure about the centerline of the counter plate.

We claim:

1. A method of assembly of a precision spindle motor, the motor including a journal and a counter plate, the method comprising the step of interference fitting an outer side surface of the counter plate to an inner interference surface of the journal, the outer side surface of the counter plate defines a non-cylindrical shape for balancing an interference pressure about the centerline of the counter plate.

2. A method of assembly of a precision spindle motor, the motor including a journal and a counter plate, the method comprising the step of interference fitting an outer side surface of the counter plate to an inner interference surface of the journal, the inner interference surface of the journal defines a non-cylindrical shape for balancing an interference pressure about the centerline of the counter plate.

3. A method of assembly of a precision spindle motor, the motor including a journal and a counter plate, the method comprising the step of interference fitting an outer side surface of the counter plate to an inner interference surface of the journal, the inner interference surface of the journal defines a taper for balancing an interference pressure about the centerline of the counter plate.

4. A precision spindle motor comprising:

a journal having a bore defined therein, the journal including a tube-like protrusion defining an inner interference surface;

a shaft located in and extending from the bore of the journal, a top portion of the shaft extending from the bore, the top portion of the shaft including an outer interference surface;

a thrust plate having a hole defined therein by an inner surface of the thrust plate, the thrust plate being mounted to the top portion of the shaft by means of an interference fit between the outer interference surface of the shaft and the inner surface of the thrust plate;

a counter plate including an outer side surface, the counter plate being mounted to the journal adjacent to the thrust plate by means of an interference fit between the inner interference surface of the journal and the outer side surface of the counter plate, wherein an interference pressure is balanced about a centerline of the counter plate.

5. A precision spindle motor according to claim 4 wherein at least one of the outer side surface of the counter plate and the inner interference surface of the journal defines a non-cylindrical shape for balancing an interference pressure about the centerline of the counter plate.

6. A precision spindle motor according to claim 5 wherein the inner interference surface defines a taper for balancing an interference pressure about a centerline of the counter plate.

* * * * *